C. P. CHRISTENSEN.
COLOR PHOTOGRAPHY.
APPLICATION FILED APR. 21, 1908.
979,129.
Patented Dec. 20, 1910.
2 SHEETS—SHEET 1.
Fig. I.
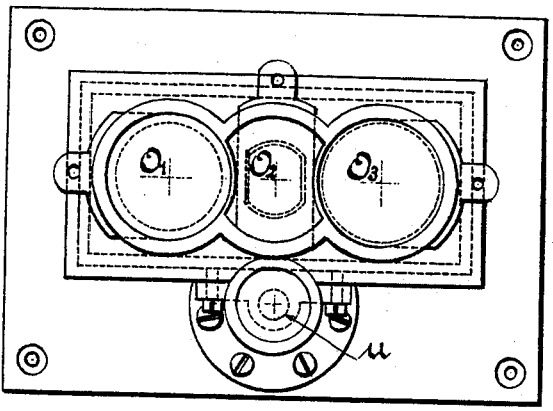
Fig. II.
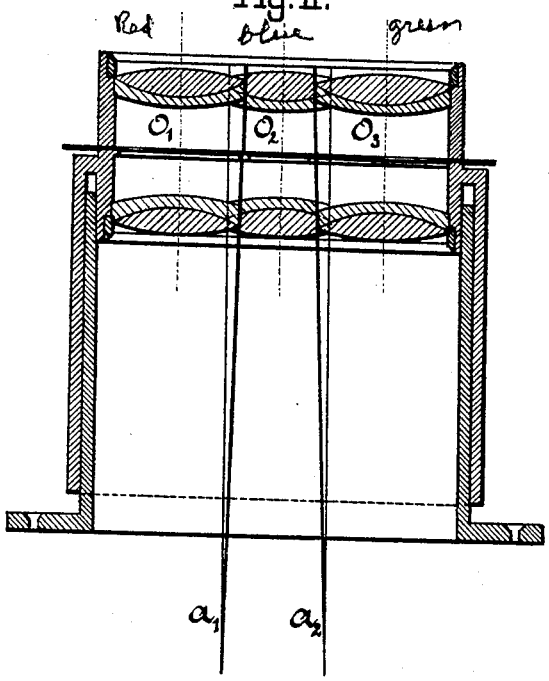
Witnesses
William C. Lang
James D'Antonio
Inventor
Christian P. Christensen
by
Rosenbaum & Stockbridge attys C. P. CHRISTENSEN.
COLOR PHOTOGRAPHY.
APPLICATION FILED APR. 21, 1908.
979,129.
Patented Dec. 20, 1910.
2 SHEETS—SHEET 2.
Fig. III.
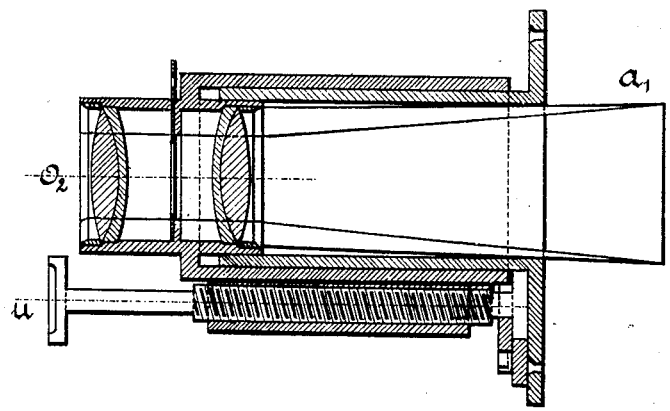

UNITED STATES PATENT OFFICE.

CHRISTIAN PETER CHRISTENSEN, OF COPENHAGEN, DENMARK.

COLOR PHOTOGRAPHY.

979,129.   Specification of Letters Patent.   Patented Dec. 20, 1910.

Application filed April 21, 1908.   Serial No. 428,380.

*To all whom it may concern:*

Be it known that I, CHRISTIAN PETER CHRISTENSEN, a subject of the King of Denmark, residing at Copenhagen, Denmark, have invented certain new and useful Improvements in Color Photography, of which the following is a full, clear, and exact description.

For each picture in ordinary kinematography a set, generally three pictures is taken through color-filters, when producing animated or moving pictures on the polychromatic method. The pictures of the same set necessarily must be taken simultaneously, even if the positives are to be projected on the screen one by one in rapid succession. If not, the objects, when moving, will look badly miscolored at the edges. When taking the pictures of one set simultaneously, they cannot be taken by one objective, as with the different ways of doing so, the light is weakened too much for kinematographic purposes. When more objectives are employed a certain stereoscopic difference of the pictures (especially if the focus of the objectives is short) is unavoidable, as they are not taken from exactly the same point of view, giving, if the objects to be taken do not all lie nearly at the same distance from the objectives, the same miscoloring of the edges. By placing the axes of the objectives very near each other and using objectives with not too short focus, this stereoscopic difference will be very small and no miscoloring will appear.

To meet all these requirements a combination as shown in Figures I, II and III is employed; in which Fig. I is a front elevation of the apparatus showing the relative positions and forms of lenses. Fig. II is a transverse section taken substantially on the center lines of the lenses. Fig. III is a vertical section taken on the center line of the middle objective.

The objectives shown in said figures have respectively been designated $O_1$, $O_2$ and $O_3$.

When taking the pictures belonging to a set, say here three, the picture to be taken through the blue color-filter needs much shorter exposure than those to be taken through the red and the green filter. Then it has to be shaded much and this is done by placing it in the middle and simply cutting away of the objectives $O_2$, making incisions in it whereby is gained, that the axes of the three objectives can be brought very near each other and the objectives for the red and green pictures still can have their full diameter and round shape and yet have sufficiently long focus. This enables me to employ the most powerful objectives and have the full benefit of their power. The objectives, of course, must be separated by thin blackened plates in order to prevent the light from one objective from mingling with the light from the others; light from one objective being maintained distinct from that of the adjoining objective back to the points $a_1$, $a_2$.

The objectives are fixed together and the whole set can be registered by the focusing screw $n$.

Having thus particularly described and ascertained the nature of this said invention and the manner, in which the same is to be performed, I declare, that what I claim is:—

Objective-sets for color-kinematography characterized by one or more of the objectives of the set being provided with incisions, in which the adjacent objective or objectives project, thereby allowing of placing the axes of the objectives very near each other and still letting one or more of the objectives keep its or their full power and round shape, substantially as described.

In witness whereof, I subscribe my signature, in the presence of two witnesses.

CHRISTIAN PETER CHRISTENSEN.

Witnesses:
 VIGGO BLOM,
 L. STUB.